(12) United States Patent
Ugolini

(10) Patent No.: US 10,149,488 B2
(45) Date of Patent: Dec. 11, 2018

(54) MACHINE FOR THE PRODUCTION AND DISPENSING OF ICE CREAM AND THE LIKE, WITH IMPROVED CONTROL SYSTEM

(71) Applicant: UGOLINI SPA, Milan (MI) (IT)

(72) Inventor: Marco Corrado Ugolini, Milan (IT)

(73) Assignee: UGOLINI SPA, Milan (IT)

( * ) Notice: Subject to any disclaimer, the term of this patent is extended or adjusted under 35 U.S.C. 154(b) by 347 days.

(21) Appl. No.: 14/513,621

(22) Filed: Oct. 14, 2014

(65) Prior Publication Data

US 2015/0101357 A1 Apr. 16, 2015

(30) Foreign Application Priority Data

Oct. 15, 2013 (IT) .............................. MI2013A1696

(51) Int. Cl.
*A23G 9/22* (2006.01)
*F25B 49/00* (2006.01)
(Continued)

(52) U.S. Cl.
CPC ............... *A23G 9/224* (2013.01); *A23G 9/08* (2013.01); *A23G 9/283* (2013.01); *F25B 49/00* (2013.01)

(58) Field of Classification Search
CPC ... A23G 9/04; A23G 9/08; A23G 9/12; A23G 9/16; A23G 9/18; A23G 9/283; F25D 2400/36; F25D 2400/361
See application file for complete search history.

(56) References Cited

U.S. PATENT DOCUMENTS 4,796,440 A * 1/1989 Shiotani .................... A23G 9/12
222/227
5,305,923 A * 4/1994 Kirschner ............ B67D 1/0021
222/129.1
(Continued)

FOREIGN PATENT DOCUMENTS

EP 0330252 A1 8/1989
WO WO 2013037882 A1 * 3/2013 ............... A23G 9/04

OTHER PUBLICATIONS

Geiger Counter Radiation Board.*
Search Report and Written Opinion for IT Application No. MI20131696, from which the instant application is based, 8 pgs.

*Primary Examiner* — Nelson Nieves
(74) *Attorney, Agent, or Firm* — Fredrikson & Byron, P.A.

(57) ABSTRACT

A machine (10) for the production and dispensing of food products such as ice cream and the like comprises a tub (11) containing a cylindrical evaporator (12) of a refrigerating circuit (13) and motor-driven helical mixer (14) which rotates coaxially inside the evaporator. The tub is also provided at the front with a tap (15) for dispensing the product through a dispensing outlet (16) which is arranged above a front zone of the machine which receives a container (18) for holding a measured amount of product. Behind the receiving zone the machine has, in the form of a single module (20), a control panel provided with means (21) for displaying information about the machine, pushbuttons (22) for operating the machine and a sensor (23) which detects the presence of an object which is placed in the vicinity of the receiving zone and activates the machine so as to prepare it for dispensing via the tap when the presence of an object is detected.

12 Claims, 1 Drawing Sheet

(51) Int. Cl.
*A23G 9/08* (2006.01)
*A23G 9/28* (2006.01)

(56) References Cited

U.S. PATENT DOCUMENTS

| | | | | |
|---|---|---|---|---|
| 5,758,571 | A * | 6/1998 | Kateman | A23G 9/04 261/140.1 |
| 5,979,166 | A | 11/1999 | Johnson | |
| 6,058,721 | A * | 5/2000 | Midden | A23G 9/045 62/136 |
| 6,176,090 | B1 | 1/2001 | Ufema | |
| 6,494,055 | B1 * | 12/2002 | Meserole | A23G 9/045 366/305 |
| 6,672,097 | B1 * | 1/2004 | Ashley | A23G 9/04 62/340 |
| 9,398,774 | B2 * | 7/2016 | Grampassi | A23G 9/04 |
| 2002/0189460 | A1 * | 12/2002 | Brown | A23G 9/04 99/275 |
| 2003/0150227 | A1 * | 8/2003 | Ross | A23G 9/16 62/188 |
| 2005/0103910 | A1 * | 5/2005 | Zweben | A23G 9/12 241/92 |
| 2006/0134275 | A1 * | 6/2006 | Maeda | A23G 9/12 426/106 |
| 2006/0255066 | A1 * | 11/2006 | Kannar | A23G 9/045 222/145.3 |
| 2007/0262081 | A1 * | 11/2007 | Feola | A23G 9/08 221/8 |
| 2008/0092580 | A1 * | 4/2008 | Mavridis | A23G 9/045 62/342 |
| 2010/0247723 | A1 * | 9/2010 | Rudolph | A23G 9/04 426/329 |
| 2011/0006054 | A1 * | 1/2011 | Garcia | A47J 27/004 219/433 |
| 2011/0266302 | A1 * | 11/2011 | Masse | F16K 3/0209 222/1 |
| 2011/0297272 | A1 * | 12/2011 | Hammonds | A23G 9/045 141/1 |
| 2013/0098098 | A1 * | 4/2013 | Ugolini | A23G 9/04 62/342 |
| 2014/0134299 | A1 * | 5/2014 | Guidorzi | A47J 31/44 426/87 |
| 2014/0212566 | A1 * | 7/2014 | Herbert | A23G 9/04 426/590 |
| 2014/0335232 | A1 * | 11/2014 | Beth Halachmi | A23G 9/00 426/87 |
| 2014/0346362 | A1 * | 11/2014 | Filson | G05D 23/1902 250/349 |

* cited by examiner

MACHINE FOR THE PRODUCTION AND DISPENSING OF ICE CREAM AND THE LIKE, WITH IMPROVED CONTROL SYSTEM

The present invention relates to a machine for the production and dispensing of ice cream and the like, in particular of the type having a tub for mixing and cooling the product and provided with a front tap for dispensing the product.

The tub of these machines usually contains the evaporator of a refrigerating circuit and a motor-driven helical mixer. During a first product preparation stage, the mixer usually rotates at a relatively high speed, while during a second maintenance stage, once preparation has terminated, it rotates at a low speed, sufficient for maintaining a uniform consistency of the product, but without ruining the product. In fact, during this second stage, an excessive mixing speed could damage the product and make it no longer suitable for dispensing.

The dispensing thrust is however usually imparted to the product precisely by means of rotation of the helical mixer which pushes the product towards the tap. In particular in the case of relatively dense products, the speed of rotation of the helical blade must be sufficiently high to produce the correct dispensing thrust. However, the speed necessary for correct dispensing is often higher than the speed which would be preferable for the product maintenance stage.

It is therefore necessary to provide the machine with a system which increases the speed of the mixer at the moment of dispensing and then causes it to return to the low speed necessary for maintaining the product, once dispensing has terminated. Solutions proposed in the prior art complicate the structure of the machine and the internal wiring and result in more costly manufacture and maintenance.

The general object of the present invention is to provide a machine of the aforementioned type, with improved control of dispensing and with a simple structure.

In view of this object the idea which has occurred is to provide, according to the invention, a machine for the production and dispensing of food products such as ice cream and the like, comprising a tub containing a cylindrical evaporator of a refrigerating circuit and a motor-driven helical mixer which rotates coaxially with the evaporator, the tub also being provided at the front with a tap for dispensing the product through a dispensing outlet arranged above a front zone of the machine which is intended to be a zone for receiving a container for holding a measured amount of product, characterized in that, behind this receiving zone, the machine has, in the form of a single module, a control panel provided with means for displaying information about the machine, pushbuttons for operating the machine and a sensor which detects the presence of an object which is placed in the vicinity of the receiving zone and which activates the machine so as to prepare it for dispensing via the tap when the presence of an object is detected.

In order to illustrate more clearly the innovative principles of the present invention and its advantages compared to the prior art, an example of embodiment applying these principles will be described below with the aid of the accompanying drawings. In the drawings.

Figure 1:
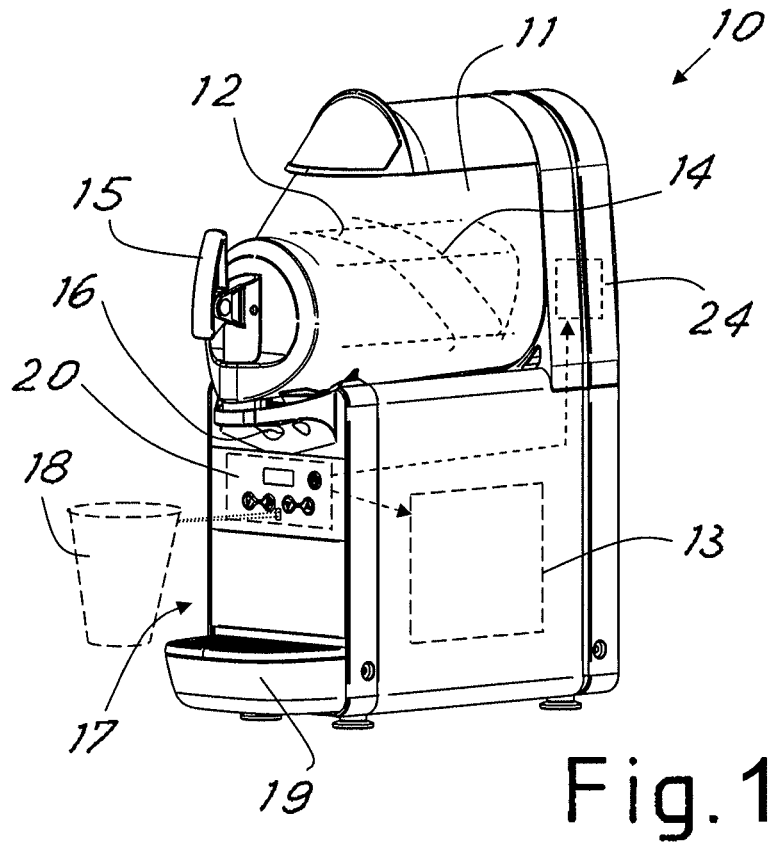
FIG. 1 shows a diagrammatic perspective view of a machine according to the invention.

With reference to the figures, FIG. 1 shows a machine, denoted generally by 10, for the production and dispensing of food products such as ice cream and the like. The machine comprises a known tub 11 containing a cylindrical evaporator 12 of a refrigerating circuit 13 and motor-driven helical mixer 14 (inside and/or outside the cylinder 12) which rotates coaxially with the evaporator.

The tub 11 also has at the front a tap 15 for dispensing the product through a dispensing outlet 16. The tap may be advantageously of the type with a control lever to be lowered or pressed in order to perform dispensing. As is known, the mixer is configured and arranged so that its rotation produces generally an effect of mixing the product which is pushed in circular fashion along the cylinder and from the rear direction to the front direction of the machine. The product is thus also pushed towards the tap which is generally arranged in front of the front ends of the cylinder and the mixer.

The dispensing outlet 16 is arranged above a front zone 17 of the machine which is intended to be a zone for receiving a container 18 (for example an ice cream cone or wafer, a cup or similar container open at the top) which is placed by the operator underneath the dispensing outlet in order to receive a measured amount of product. Underneath the receiving zone 17 the machine may advantageously comprise a shelf 19 for placing the container if necessary and for collecting dispersed droplets of product.

Behind the receiving zone 17 the machine has, in the form of a single module 20 (as can be seen more clearly in FIG. 2), a control panel provided with means 21 for displaying information about the machine, pushbuttons 22 for operating the machine and a sensor 23 which detects the presence of an object which is placed in the vicinity of the receiving zone. In particular, the sensor 23 is designed to detect a container 18 which is placed underneath the dispensing outlet.

The sensor is advantageously of the reflective infrared type, namely with an infrared light emitter and a corresponding receiver alongside.

When the presence of an object is detected, the sensor 23 activates the machine so as to prepare it for dispensing via the tap. The machine may thus be for example in a product conservation state (where for example the mixer rotates at low speed) and be brought automatically into a state suitable for dispensing just before the operator opens the tap. In particular, upon detecting the presence of an object, the sensor may send a signal which causes an increase in the speed of rotation of the helical mixer, suitably controlling the electric motor 24 for rotation of the mixer, so as to increase the force with which the mixer pushes the product towards the tap and facilitate dispensing. The sensor signal may also activate other machine functions, such as the refrigerating circuit, if required by the dispensing conditions.

Figure 2:
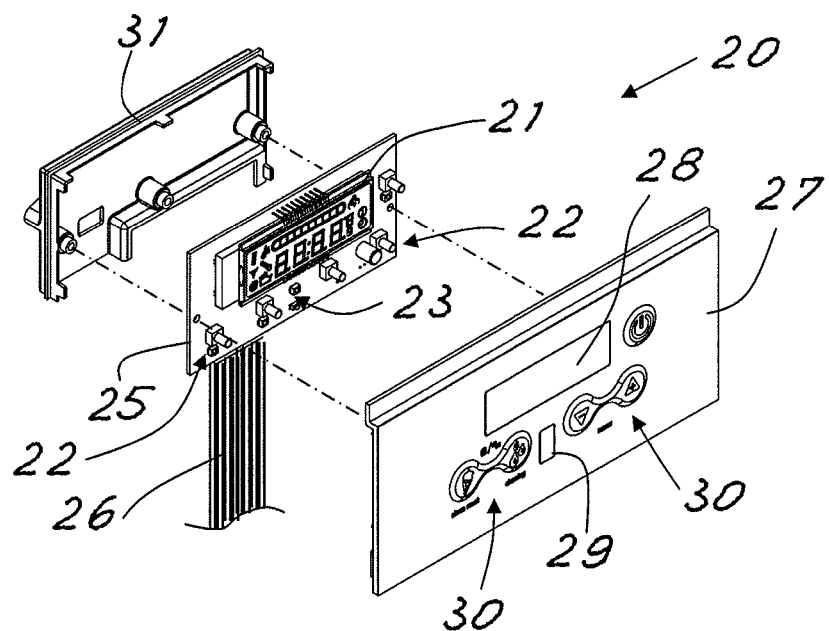
FIG. 2 shows an exploded view of a control module of the machine according to FIG. 1.

As can be clearly seen again in FIG. 2, the module 20 comprises advantageously a printed circuit board 25 which has on its front side the display means (advantageously comprising a display and, optionally, signalling LEDs), the operating pushbuttons 22 and the optical sensor 23. An ON/OFF pushbutton may also be provided.

The board also advantageously houses control circuits (not shown, being for example able to be easily imagined by the person skilled in the art), such as a microprocessor circuit suitably programmed for control of the machine functions and management of the display and the commands entered via the buttons. The module may thus also comprise the entire control system of the machine, with a substantial reduction in the constructional complexity and the wiring of the machine. Electric cables 26 depart from the printed circuit board 25 and are directed towards the rest of the machine for control and powering thereof.

Preferably the sensor is arranged underneath the display and in the vicinity of a vertical centre line of the control panel and between two groups of command pushbuttons which are arranged on the sides. This position has been found to be particularly advantageous for correct detection by the sensor, while at the same time maintaining small dimensions of the printed circuit board and ease of use of the user interface.

The board is advantageously applied behind a front wall 27 of the machine which is below the said dispensing outlet and behind the receiving zone. This wall preferably forms a front side of the said module 20 and comprises surfaces 28, 29 which are at least partially transparent (also in the form of simple shaped holes) opposite the display means and the sensor. The wall may also comprise visible touch keys 30 for operating the pushbuttons on the printed circuit board. Alternatively, the pushbuttons may be also provided with touch keys and project with them from holes in the wall 27.

The module may also advantageously comprise a rear cover 31 for enclosing the printed circuit 25 in sandwich form between this rear cover and the front cover 27. In this way, the module is an independent and protected system which can be easily installed in its seat in the front part of the machine. This facilitates initial assembly of the machine and the subsequent maintenance and, if necessary, replacement of the entire module in the event of a malfunction.

At this point it is clear how the predefined objects have been achieved. In particular, with the principles of the invention a machine with a simple structure is obtained, allowing a rapid response and adaptation of the dispensing conditions immediately prior to the dispensing command activated by the user.

Obviously the description above of an embodiment applying the innovative principles of the present invention is provided by way of example of these innovative principles and must therefore not be regarded as limiting the scope of the rights claimed herein.

For example, the appearance of the machine may vary depending on the specific requirements. Other pushbuttons, commands and display means may be provided on the front side of the module or in other parts of the machine.

The invention claimed is:

1. A machine for the production and dispensing of food products such as ice cream, comprising a tub containing a cylindrical evaporator of a refrigerating circuit and a motor-driven helical mixer which rotates coaxially relative to the evaporator, the tub having a tap for dispensing product via a dispensing outlet arranged above a front zone of the machine, the zone configured for receiving a container for holding an amount of the product, wherein rearward of the zone, the machine has, in a form of a single module, a control panel provided with means for displaying information about the machine, pushbuttons for operating the machine and a sensor which detects presence of an object placed in the zone, the machine being activated to prepare for dispensing of the product via the tap and increasing rotation of the helical mixer from a first, non-zero speed to a second speed when presence of the object is detected by the sensor and prior to the tap being opened.

2. The machine according to claim 1, wherein when the presence of the object is detected, the sensor sends a signal to a control circuit of the machine which causes speed of rotation of the helical mixer to increase.

3. The machine according to claim 1, wherein the nodule comprises a printed circuit board, on one side of which the display means, the operating pushbuttons and the sensor are arranged, the board being applied rearward of a front wall of the machine which is below the dispensing outlet and rearward of the zone.

4. The machine according to claim 3, wherein the front wall is a front side of the module which comprises surfhces which are at least partially transparent opposite the display means and the sensor, and visible touch-key elements for operating the pushbuttons on the printed circuit board.

5. The machine according to claim 4, wherein the module comprises a rear cover for enclosing the printed circuit board between the rear cover and the front wall.

6. The machine according to claim 1, wherein the sensor is an infrared reflective optical sensor.

7. The machine according to claim 1, wherein the display means comprise a display, and wherein the sensor is arranged in a vicinity of a vertical center line of the control panel and underneath the display and between two groups of the operating pushbuttons.

8. The machine according to claim 1 wherein the first, non-zero speed corresponds to a helical mixer rotation speed at which the product is maintained in the tub.

9. The machine according to claim 1, wherein the second speed corresponds to a helical mixer rotation speed for an increased force with which the mixer pushes the product, towards the tap for dispensing the product from the tub via the dispensing outlet.

10. The machine according to claim 8, wherein the second speed corresponds to a helical mixer rotation speed for an increased force with which the mixer pushes the product towards the tap for dispensing the product from the tub via the dispensing end.

11. The machine according to claim 1, wherein the mixer is positioned upstream of the tap.

12. The machine according to claim 1, wherein the mixer is located inside the tub.

* * * * *